(12) United States Patent
Yang et al.

(10) Patent No.: US 11,339,896 B2
(45) Date of Patent: May 24, 2022

(54) BLOCK AND FLUID CONTROL DEVICE

(71) Applicant: Zhejiang Sanhua Intelligent Controls Co., Ltd., Shaoxing (CN)

(72) Inventors: Shizhao Yang, Zhejiang (CN); Xibo Liu, Zhejiang (CN)

(73) Assignee: Zhejiang Sanhua Intelligent Controls Co., Ltd., Shaoxing (CN)

( * ) Notice: Subject to any disclaimer, the term of this patent is extended or adjusted under 35 U.S.C. 154(b) by 24 days.

(21) Appl. No.: 16/648,618

(22) PCT Filed: Sep. 20, 2018

(86) PCT No.: PCT/CN2018/106664
§ 371 (c)(1),
(2) Date: Mar. 18, 2020

(87) PCT Pub. No.: WO2019/062636
PCT Pub. Date: Apr. 4, 2019

(65) Prior Publication Data
US 2020/0240546 A1    Jul. 30, 2020

(30) Foreign Application Priority Data

Sep. 29, 2017   (CN) .......................... 201710903015.2
Sep. 29, 2017   (CN) .......................... 201721264027.7

(51) Int. Cl.
*F16K 37/00*   (2006.01)
*F16K 11/20*   (2006.01)
*F16K 27/00*   (2006.01)

(52) U.S. Cl.
CPC .......... *F16K 37/0091* (2013.01); *F16K 11/20* (2013.01); *F16K 27/00* (2013.01)

(58) Field of Classification Search
CPC ....... F16K 37/0091; F16K 27/00; F16K 11/20
See application file for complete search history.

(56) References Cited

U.S. PATENT DOCUMENTS 6,293,310 B1   9/2001   Redemann et al.
9,057,449 B2   6/2015   Iwata et al.
(Continued)

FOREIGN PATENT DOCUMENTS

CN   202531942 U   11/2012
CN   202812252 U   3/2013
(Continued)

OTHER PUBLICATIONS

International Search Report and Written Opinion for International Application No. PCT/CN2018/106664, dated Dec. 21, 2018.
(Continued)

*Primary Examiner* — Kevin L Lee
(74) *Attorney, Agent, or Firm* — Wolf, Greenfield & Sacks, P.C.

(57) ABSTRACT

A block and a fluid control device includes a first mounting cavity. A wall portion of a first fluid passage is provided with a first valve. A first mounting-cavity bottom wall includes a first sub-bottom wall, and the height of the first sub-bottom wall increases as the first sub-bottom wall extends from a first end of the first sub-bottom wall toward a second end of the first sub-bottom wall. The pressure drop across the block and the fluid control device is low.

17 Claims, 7 Drawing Sheets

(56) References Cited

U.S. PATENT DOCUMENTS

| | | |
|---|---|---|
| 2005/0269537 A1 | 12/2005 | Kung |
| 2016/0069473 A1 | 3/2016 | Kucera et al. |
| 2016/0077531 A1 | 3/2016 | Kucera et al. |
| 2017/0089484 A1 | 3/2017 | Müller |
| 2018/0238461 A1* | 8/2018 | Ogawa et al. .......... F16K 27/00 |
| 2020/0325887 A1* | 10/2020 | Watanabe et al. ........ F16K 7/12 |

FOREIGN PATENT DOCUMENTS

| | | |
|---|---|---|
| CN | 203836296 U | 9/2014 |
| CN | 204267810 U | 4/2015 |
| CN | 204852479 U | 12/2015 |
| CN | 105402478 A | 3/2016 |
| CN | 105422953 A | 3/2016 |
| CN | 105587890 A | 5/2016 |
| CN | 206017991 U | 3/2017 |
| CN | 207762318 U | 8/2018 |
| DE | 73 17 544 U | 10/1988 |
| DE | 10 2015 012 444 A1 | 3/2017 |
| WO | WO 02/10594 A1 | 2/2002 |
| WO | WO 2017/024216 A1 | 2/2017 |

OTHER PUBLICATIONS

Extended European Search Report for European Application No. 18862178.3, dated May 26, 2021.

* cited by examiner

US 11,339,896 B2

BLOCK AND FLUID CONTROL DEVICE

This application is a national stage filing under 35 U.S.C. § 371 of International Patent Application Serial No. PCT/CN2018/106664, filed Sep. 20, 2018, which claims priority to the following two Chinese patent applications, the contents of these applications are incorporated herein by reference in their entirety:

1) Chinese Patent Application No. 201710903015.2, filed with the China National Intellectual Property Administration on Sep. 29, 2017, titled "BLOCK AND FLUID CONTROL DEVICE"; and
2) Chinese Patent Application No. 201721264027.7, filed with the China National Intellectual Property Administration on Sep. 29, 2017, titled "FLUID CONTROL DEVICE".

FIELD

The present application relates to the field of fluid control.

BACKGROUND

In the field of fluids, a fluid control device is generally required to realize the communication or cutoff of a flow passage. Cases of large flow resistance and large pressure drop are easy to be encountered in a flow process. Therefore, the magnitude of the pressure drop is an important consideration in a structural design of the fluid control device.

SUMMARY

An object of the present application is to provide a block and a fluid control device that have a small pressure drop.

In order to achieve the above object, the following technical solution is adopted: a block includes a first mounting cavity and a first fluid passage, one end of the first fluid passage is an inlet, and the first fluid passage is in communication with the first mounting cavity. The block includes a passage wall portion, the passage wall portion is located at a periphery of the first fluid passage, and a periphery side portion of the passage wall portion is at least provided with a first valve port, and the first valve port is in communication with the first fluid passage and the first mounting cavity.

The block at least includes a first-mounting-cavity bottom wall, and the first-mounting-cavity bottom wall at least includes a first sub-bottom wall, one end of the first sub-bottom wall is relatively close to the first valve port, and is defined as a first end, and the other end of the first sub-bottom wall is relatively away from the first valve port, and is defined as a second end. With an axial direction of the first mounting cavity as a height direction, the first sub-bottom wall extends from the first end of the first sub-bottom wall toward the second end of the first sub-bottom wall in such a manner that the height of the sub-bottom wall is progressively increased.

To achieve the above object, the following technical solution is provided in the present application.

A fluid control device includes a first core portion and a block according to the above, the block includes a first mounting cavity inner wall, the first core portion is at least partially located in the first mounting cavity, the first core portion is in sealing arrangement with the first mounting cavity inner wall, and the first core portion includes a first cooperating wall.

The fluid control device includes an inlet and a first outlet, and the inlet is in communication with the first mounting cavity. The block includes a first top wall, the first top wall is located in the first mounting cavity, and at least part of the first cooperating wall is in cooperation with the first top wall. A clearance is reserved between the first cooperating wall and the first top wall, and the first mounting cavity is in communication with the first outlet; or the first cooperating wall is in sealing arrangement with the first top wall, and the first mounting cavity is not in communication with the first outlet.

In the above technical solutions, the first mounting cavity and the first fluid passage are provided, the periphery side portion of the passage wall portion of the first fluid passage is provided with the first valve port, the first-mounting-cavity bottom wall includes the first sub-bottom wall, and the first sub-bottom wall extends from the first end of the first sub-bottom wall toward the second end of the first sub-bottom wall in such a manner that the height of the sub-bottom wall is progressively increased, such that the pressure drop of the block and the fluid control device is small.

DETAILED DESCRIPTION OF THE EMBODIMENTS

Figure 1:
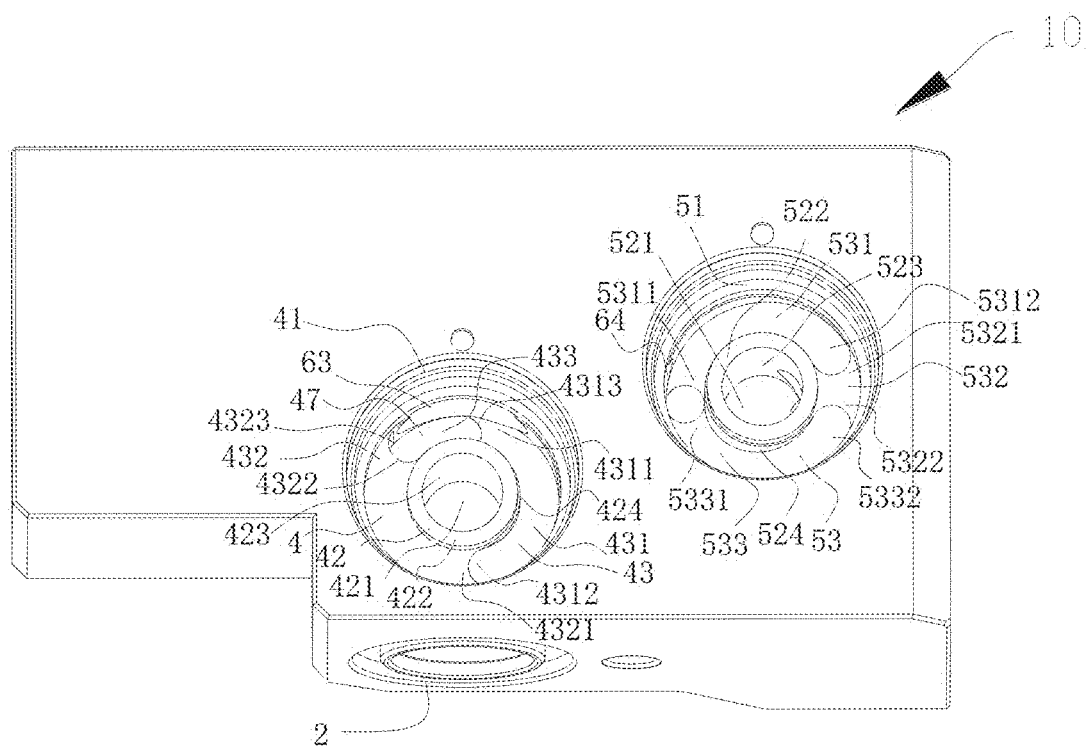
FIG. 1 is a schematic structural view of a first embodiment according to the present application.
Figure 2:
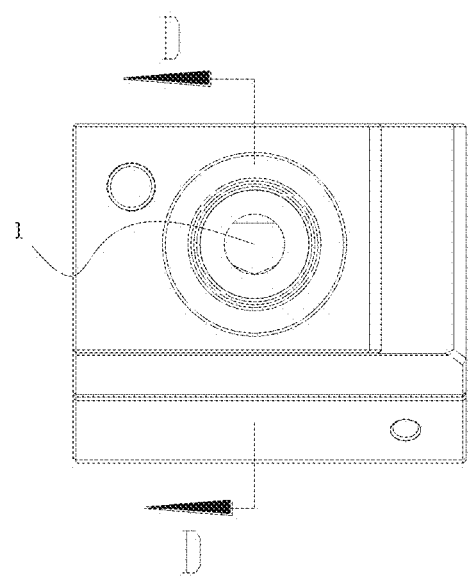
FIG. 2 is a schematic left view of the embodiment shown in FIG. 1.
Figure 3:
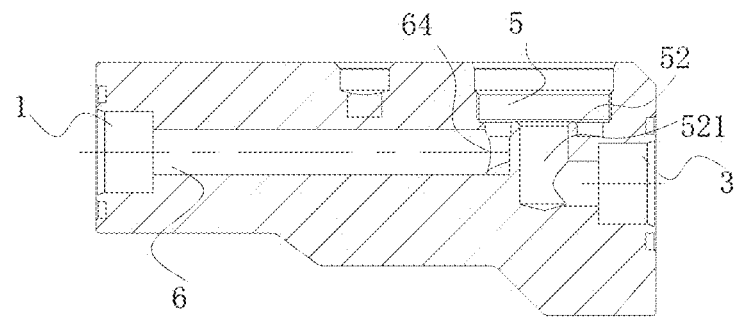
FIG. 3 is a schematic sectional view taken along line D-D in FIG. 2.
Figure 4:
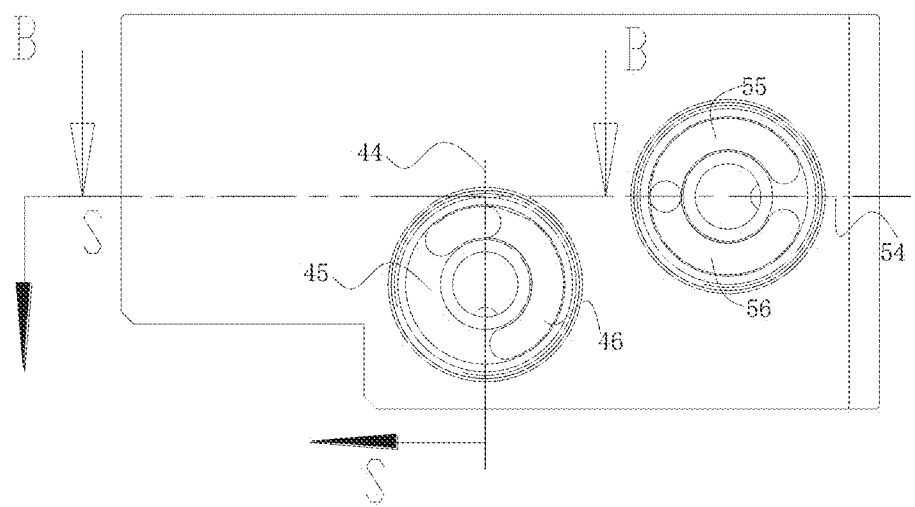
FIG. 4 is schematic top view of the embodiment shown in FIG. 1.
Figure 5:
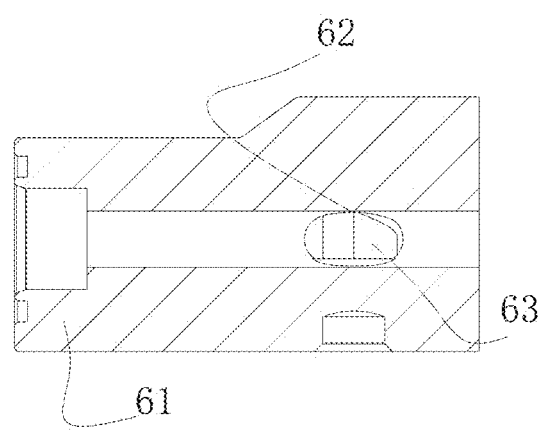
FIG. 5 is a schematic sectional view taken along line B-B in FIG. 4.
Figure 6:
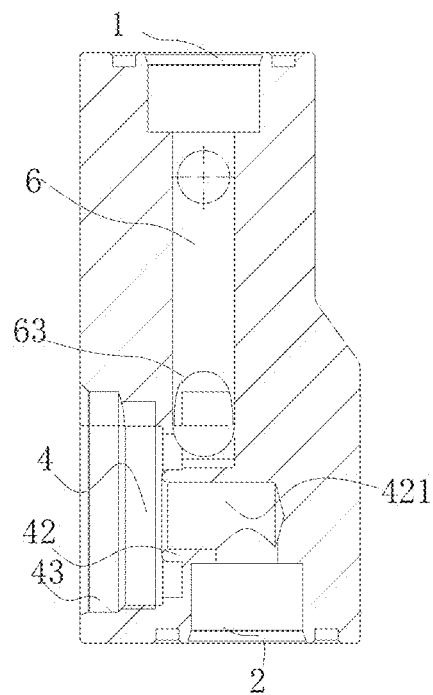
FIG. 6 is a schematic sectional view taken along line S-S in FIG. 4.

In an embodiment, referring to FIG. 1 and FIG. 2, FIG. 1 illustrates a structure of a block 10, the block 10 includes an inlet 1, a first outlet 2, a second outlet 3, a first mounting cavity 4, a second mounting cavity 5 and a first fluid passage 6, wherein the first fluid passage 6 is in communication with the first mounting cavity 4 and the second mounting cavity 5.

Referring to FIGS. 1 to 6, the block 10 includes a passage wall portion 61 forming the first fluid passage 6, the inlet 1 is located at one end portion of the first fluid passage 6, at least part of a periphery side portion 62 of the passage wall portion 61 is provided with a first valve port 63, and the first valve port 63 is in communication with the first mounting cavity 4. The first valve port 63 arranged on the passage wall portion 61 communicates the first fluid passage 6 with the first mounting cavity 4. The other end of the first fluid passage 6 is a second valve port 64, and the second valve port 64 communicates the second mounting cavity 5 with the first fluid passage 6.

The periphery side portion 62 is a wall corresponding to the first fluid passage 6, and the first valve port 63 is provided in the periphery side portion 62, the inlet 1 is located at a port of the first fluid passage 6, and a flow passage entering the first valve port 63 from the inlet 1 is a non-linear flow passage.

The block 10 includes a first mounting cavity inner wall 41 and a first annular portion 42, the first mounting cavity inner wall 41 is part of a wall portion forming the first mounting cavity 4, and the first annular portion 42 is located in a middle of the first mounting cavity 4.

The first annular portion 42 includes a first through hole 421, the first through hole 421 is in communication with the first mounting cavity 4, and the first through hole 421 is in communication with the first outlet 2. The first annular portion 42 includes a first top wall 422, a first annular inner wall 423 and a first annular outer wall 424, where the first annular inner wall 423 is part of a wall portion forming the first through hole 421, and the first top wall 422 and the first annular outer wall 424 are parts of a wall portion forming the first mounting cavity 4. A diameter of the first annular outer wall 424 is smaller than an inner diameter of the first mounting cavity inner wall 41. With an axial direction H (shown in FIG. 6) of the first mounting cavity 4 as a height direction, a height of the first annular outer wall 424 is smaller than that of the first mounting cavity inner wall 41, such that a flow passage of the block 10 is formed between the first annular outer wall 424 and the first mounting cavity inner wall 41.

The block 10 includes a first-mounting-cavity bottom wall 43. With the axial direction H of the first mounting cavity 4 as the height direction, a height of the first-mounting-cavity bottom wall 43 is lower than that of the first top wall 422. The first-mounting-cavity bottom wall 43 radially extends from a circumferential outer edge of the first annular portion 42 to the first mounting cavity inner wall 41.

The first-mounting-cavity bottom wall 43 at least includes a first sub-bottom wall 431. One end of the first sub-bottom wall 431 is relatively close to the first valve port 63, and is defined as a first end 4311, and the other end of the first sub-bottom wall 431 is relatively away from the first valve port 63, and is defined as a second end 4312. Herein, the ends refer to end portions of the first sub-bottom wall 431. With the axial direction H of the first mounting cavity 4 as the height direction, the first sub-bottom wall 431 extends from the first end 4311 of the first sub-bottom wall toward the second end 4312 in such a manner that the height of the sub-bottom wall is progressively increased. It should be noted that, in the present application, at a connection of the sub-bottom walls, the first end 4311 and the second end 4312 can be defined by the height, for example, the first end of the first sub-bottom wall is the lowest position of the first sub-bottom wall, and the second end of the first sub-bottom wall is the highest position of the first sub-bottom wall.

It should be understood that the first-mounting-cavity bottom wall 43 may have other structures in addition to the first sub-bottom wall 431, and the first end is not limited to being actually adjacent to the first valve port, and "relatively close to" and "relatively away from" are for the first end and the second end.

When the fluid enters the first mounting cavity 4 from the first valve port 63, the fluid moves along the first sub-bottom wall 431, and the movement trace of the fluid is clear. Since the first sub-bottom wall 431 extends in a height-progressive-increasing manner, the flow resistance of the fluid flowing through the first sub-bottom wall 431 is relatively small, which helps to reduce the pressure drop.

The first mounting cavity 4 includes a first centerline 44. The first centerline 44 is perpendicular to the first fluid passage 6. The first centerline 44 divides the first mounting cavity 4 into a first mounting sub-cavity 45 and a second mounting sub-cavity 46, where the first mounting sub-cavity 45 is relatively close to the inlet 1 of the first fluid passage 6, and the second mounting sub-cavity 46 is relatively away from the inlet 1 of the first fluid passage 6. Most of the first sub-bottom wall 431 is part of a wall portion forming the second mounting sub-cavity 46.

Further, the first end 4311 of the first sub-bottom wall 431 is located in the second mounting sub-cavity 46, which facilitates the flow of the fluid from the first fluid passage 6 into the first valve port 63 and the rise of the flow along the first sub-bottom wall 431 to provide a certain guiding effect for the fluid while reducing the pressure drop of the fluid entering the first mounting cavity 4 through the first valve port 63.

The first-mounting-cavity bottom wall 43 at least includes a first platform portion 432. The first platform portion 432 is connected to the second end 4312 of the first sub-bottom wall 431. With the axial direction H of the first mounting cavity 4 as the height direction, a height of the first platform portion 432 is lower than that of the first top wall 422, and the height of the first platform portion 432 is higher than that of the first sub-bottom wall 431. An end portion, connected with the second end 4312 of the first sub-bottom wall 431, of the first platform portion 432 is defined as a first end 4321 of the first platform portion, and the other end of the first platform portion 432 is defined as a second end 4322 of the first platform portion. The second end 4312 of the first sub-bottom wall 431 is connected to the first platform portion 432, which guides the fluid entering the first mounting cavity 4 to gradually rise to the height of the first platform portion 432, so that the fluid smoothly rises to a certain height. Moreover, the fluid is also prevented from whirling in the first mounting cavity 4.

The first-mounting-cavity bottom wall 43 at least includes a second sub-bottom wall 433. A height of the second sub-bottom wall 433 is lower than that of the first sub-bottom wall 431, and the second sub-bottom wall 433 connects the first sub-bottom wall 431 with the first platform portion 432. Herein, a direction toward an opening of the first mounting cavity 4 is defined as an upward direction, a direction toward the first-mounting-cavity bottom wall 43 is defined as a downward direction, then the block 10 includes a first side wall 4313 extending downward from the first end 4311 of the first sub-bottom wall 431 and a second side wall 4323 extending downward from the second end 4322 of the first platform portion 432. The first mounting cavity 4 includes a first groove hole 47, where the first side wall 4313, the second side wall 4323 and the second sub-bottom wall 433 are part of the wall portion forming the first groove hole 47, the first valve port 63 is arranged on part of the wall portion of the first mounting cavity inner wall 41 forming the first groove hole 47, and since the first fluid passage 6 is in communication with the first mounting cavity 4 at the first valve port 63, the first valve port 63 is also arranged on the first mounting cavity inner wall 41. Since the first groove hole 47 is arranged around the first valve port 63, a passage through which the fluid enters the first mounting cavity 4 from the first valve port 63 is relatively wide, such that the flow resistance of the fluid after flowing through the first valve port 63 is relatively small. A part of the first valve port 63 is located in the first mounting sub-cavity 45, another part of the first valve port 63 is located in the second mounting sub-cavity 46, and most of the first groove hole 47 is located in the first mounting sub-cavity 45, such that the fluid entering from the first valve port 63 flows through the first groove hole 47 to the first sub-bottom wall 431, and the movement of the fluid is smooth, which helps to reduce the pressure drop.

The block 10 further includes a second mounting cavity inner wall 51 and a second annular portion 52, the second mounting cavity inner wall 51 is part of a wall portion forming the second mounting cavity 5, and the second annular portion 52 is located in a middle of the second mounting cavity 5.

The second annular portion 52 includes a second through hole 521, the second through hole 521 is in communication with the second mounting cavity 5, and the second through hole 521 is in communication with the second outlet 3. The second annular portion 52 includes a second top wall 522, a second annular inner wall 523 and a second annular outer wall 524, where the second annular inner wall 523 is part of a wall portion forming the second through hole 521, and the second top wall 522 and the second annular outer wall 524 are parts of a wall portion forming the second mounting cavity 5. A diameter of the second annular outer wall 524 is smaller than an inner diameter of the second mounting cavity inner wall 51. With an axial direction H of the second mounting cavity 5 as a height direction, a height of the second annular outer wall 524 is smaller than that of the second mounting cavity inner wall 51.

The block 10 includes a second-mounting-cavity bottom wall 53. With the axial direction H of the second mounting cavity 5 as the height direction, a height of the second-mounting-cavity bottom wall 53 is lower than that of the second top wall 522. The second-mounting-cavity bottom wall 53 radially extends from a circumferential outer edge of the second annular portion 52 to the second mounting cavity inner wall 51.

The second-mounting-cavity bottom wall 53 at least includes a third sub-bottom wall 531. One end of the third sub-bottom wall 531 is relatively close to the second valve port 64, and is defined as a first end 5311 of the third sub-bottom wall, and the other end of the third sub-bottom wall 531 is relatively away from the second valve port 64, and is defined as a second end 5312 of the third sub-bottom wall. Herein, the ends refer to end portions of the third sub-bottom wall 531. With the axial direction H of the second mounting cavity 5 as the height direction, the third sub-bottom wall 531 extends from the first end 5311 of the third sub-bottom wall toward the second end 5312 in such a manner that the height of the sub-bottom wall is progressively increased.

The second mounting cavity 5 includes a second centerline 54. The second centerline 54 is in parallel with the first fluid passage 6. The second centerline 54 divides the second mounting cavity 5 into a third mounting sub-cavity 55 and a fourth mounting sub-cavity 56, where the third mounting sub-cavity 55 and the fourth mounting sub-cavity 56 are located on two sides of an extending direction of the first fluid passage 6. Most of the third sub-bottom wall 531 is located in the third mounting sub-cavity 55.

The second-mounting-cavity bottom wall 53 at least includes a fourth sub-bottom wall 533. One end of the fourth sub-bottom wall 533 is relatively close to the second valve port 64, and is defined as a first end 5331 of the fourth sub-bottom wall, and the other end of the fourth sub-bottom wall 533 is relatively away from the second valve port 64, and is defined as a second end 5332 of the fourth sub-bottom wall. Herein, the ends refer to end portions of the fourth sub-bottom wall 533. With the axial direction H of the second mounting cavity 5 as the height direction, the fourth sub-bottom wall 533 extends from the first end 5331 of the fourth sub-bottom wall toward the second end 5332 in such a manner that the height of the sub-bottom wall is progressively increased. Most of the fourth sub-bottom wall 533 is located in the fourth mounting sub-cavity 56. Through the arrangement of the third sub-bottom wall 531 and the fourth sub-bottom wall 533, the fluid moves along the third sub-bottom wall 531 and the fourth sub-bottom wall 533 after entering the second mounting cavity 5 through the second valve port 64. The movement of the fluid in the second mounting cavity 5 is regular, and it is not easy to increase the pressure drop due to movement disorder (for example, whirl).

In an embodiment, the second-mounting-cavity bottom wall 53 includes a second platform portion 532. The second platform portion 532 is connected to the second end 5312 of the third sub-bottom wall 531. With the axial direction of the second mounting cavity 5 as the height direction, a height of the second platform portion 532 is higher than that of the third sub-bottom wall 531, and the height of the second platform portion 532 is lower than that of the second top wall 522. Thus, the fluid enters the second mounting cavity 5 through the second valve port 64, and then moves to the second platform portion 532 along the third sub-bottom wall 531. Since the height of the second platform portion 532 is higher than that of the third sub-bottom wall 531, and the fluid enters the second through hole 521 after the transition of the third sub-bottom wall 531, the pressure drop of the fluid is lower.

The second end 5332 of the fourth sub-bottom wall 533 is connected to the second platform portion 532. Thus, most of the fluid entering the second mounting cavity 5 through the second valve port 64 is divided into two strands, one strand flows along the third sub-bottom wall 531, the other strand flows along the fourth sub-bottom wall 533, and then most of the fluid enters the second through hole 521 through the second platform portion 532, such that the flowing resistance of the fluid in the second mounting cavity 5 is small, and the pressure drop is relatively low.

In another embodiment, the second end 5312 of the third sub-bottom wall 531 is connected to the second end 5332 of the fourth sub-bottom wall 533. The second end 5312 of the third sub-bottom wall 531 is defined as the highest position of the third sub-bottom wall 531, and the second end 5332 of the fourth sub-bottom wall 533 is defined as the highest position of the fourth sub-bottom wall 533. In this way, most of the fluid entering the second mounting cavity 5 through the second valve port 64 is divided into two strands, one strand flows along the third sub-bottom wall 531, the other strand flows along the fourth sub-bottom wall 533, and then most of the fluid enters the second through hole 521 through the adjacent ends of the third sub-bottom wall 531 and the fourth sub-bottom wall 533, such that the flowing resistance of the fluid in the second mounting cavity 5 is small, and the pressure drop is relatively low.

The block 10 at least includes a first side portion, a second side portion and a third side portion. The inlet 1 for the fluid is located on the first side portion, the first outlet 2 is located on the second side portion, the second outlet 3 is located on the third side portion, the first side portion and the third side portion are oppositely arranged, and the second side portion connects the first side portion with the third side portion.

Figure 7:
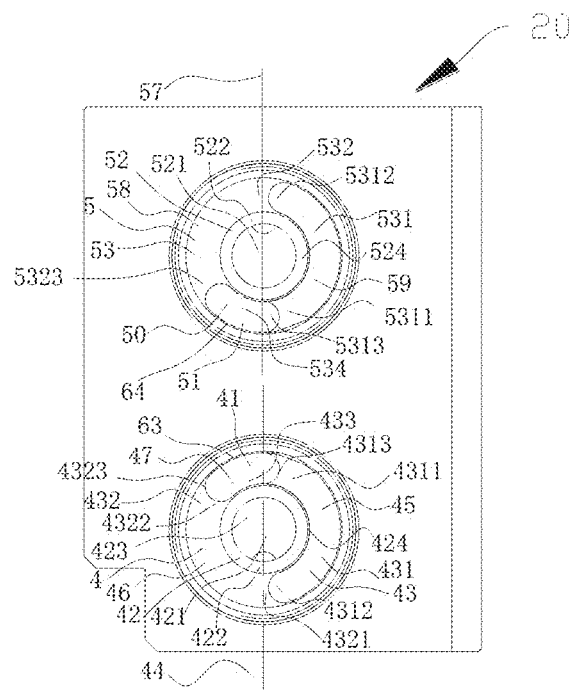
FIG. 7 is a schematic view of a second embodiment according to the present application.

In an embodiment, referring to FIG. 7, FIG. 7 illustrates a general structure of a block 20, the block 20 includes an inlet 1, a first outlet 2, a second outlet 3, a first mounting cavity 4, a second mounting cavity 5 and a first fluid passage 6, wherein the first fluid passage 6 is in communication with the first mounting cavity 4 and the second mounting cavity 5.

The block 20 includes a passage wall portion 61 forming the first fluid passage 6, the inlet 1 is located at an end portion of the first fluid passage 6, a first valve port 63 is provided at a periphery side portion 62 of the passage wall portion 61, a second valve port 64 is further provided at the periphery side portion 62 of the passage wall portion 61, the first valve port 63 communicates the first fluid passage 6 with the first mounting cavity 4, and the second valve port 64 communicates the second mounting cavity 5 with the first fluid passage 6. Herein, the periphery side portion 62 of the passage wall portion 61 refers to a peripheral side position of the passage wall portion 61. The structure of the first mounting cavity 4 refers to the above embodiment.

In the present embodiment, the second-mounting-cavity bottom wall 53 at least includes a third sub-bottom wall 531. One end of the third sub-bottom wall 531 is relatively close to the second valve port 64, and is defined as a first end 5311 of the third sub-bottom wall, and the other end of the third sub-bottom wall 531 is relatively away from the second valve port 64, and is defined as a second end 5312 of the third sub-bottom wall. The third sub-bottom wall 531 extends from the first end 5311 of the third sub-bottom wall toward the second end 5312 in such a manner that the height of the sub-bottom wall is progressively increased.

The second mounting cavity 5 includes a third centerline 57. The third centerline 57 is perpendicular to the first fluid passage 6. The third centerline 57 divides the second mounting cavity 5 into a sixth mounting sub-cavity 58 and a fourth mounting sub-cavity 59, where the fifth mounting sub-cavity 58 is relatively close to the inlet 1 of the first fluid passage 6, and the sixth mounting sub-cavity 59 is relatively away from the inlet 1 of the first fluid passage 6. Most of the third sub-bottom wall 531 is part of a wall portion forming the sixth mounting sub-cavity 59.

The second-mounting-cavity bottom wall 53 at least includes a second platform portion 532, and the second platform portion 532 is connected to the second end 5312 of the third sub-bottom wall 531. With the axial direction of the second mounting cavity 5 as the height direction, the height of the second platform portion 532 is lower than that of the second top wall 522, and the height of the second platform portion 532 is higher than that of the third sub-bottom wall 531. The second platform portion 532 includes the first end 5321 and the second end 5322, and the definitions of the first end and the second end are described as above.

The second-mounting-cavity bottom wall 53 at least includes a fifth sub-bottom wall 534, a height of the fifth sub-bottom wall 534 is lower than that of the third sub-bottom wall 531, and the fifth sub-bottom wall 534 connects the third sub-bottom wall 531 with the second platform portion 532. In the present embodiment, a direction toward an opening of the second mounting cavity 5 is defined as an upward direction, and a direction toward the second-mounting-cavity bottom wall 53 is defined as a downward direction. The block 20 includes a third side wall 5313 extending downward from the first end 5311 of the third sub-bottom wall 531 and a fourth side wall 5323 extending downward from the second end 5322 of the second platform portion 532.

Further, the first end 5311 of the third sub-bottom wall 531 is located in the sixth mounting sub-cavity 59, which facilitates the flow of the fluid from the first fluid passage 6 into the second valve port 64 and the rise of the flow along the third sub-bottom wall 531 to the second platform portion 532 to provide a certain guiding effect for the fluid while reducing the pressure drop of the fluid entering the second mounting cavity 4 through the second valve port 63.

The second mounting cavity 5 includes a second groove hole 50, where the third side wall 5313, the fourth side wall 5323 and the fifth sub-bottom wall 534 are part of the wall portion forming the second groove hole 50, and the second valve port 64 is arranged on part of the wall portion of the second mounting cavity inner wall 51 forming the second groove hole 50, which is defined as the description of the first valve port 63. Since the second groove hole 50 is arranged around the second valve port 64, a passage through which the fluid enters the second mounting cavity 5 through the second valve port 64 is relatively wide, and the flow resistance of the fluid after passing through the second valve port 64 is relatively small. Part of the second valve port 64 is located in the fifth mounting sub-cavity 58, another part of the second valve port 64 is located in the sixth mounting sub-cavity 59, and most of the second groove hole 50 is located in the fifth mounting sub-cavity 58, such that the fluid entering from the second valve port 64 flows through the second groove hole 50 to the third sub-bottom wall 531, and the movement of the fluid is smooth.

The block 20 at least includes a first side portion, a second side portion and a third side portion. The inlet 1 for the fluid is located on the first side portion, the first outlet 2 is located on the second side portion, the second outlet 3 is located on the third side portion, the second side portion and the third side portion are oppositely arranged, and the first side portion connects the second side portion with the third side portion.

The first valve port 63 and the second valve port 64 may be located on two sides of the centerline of the first fluid passage 6.

Figure 8:
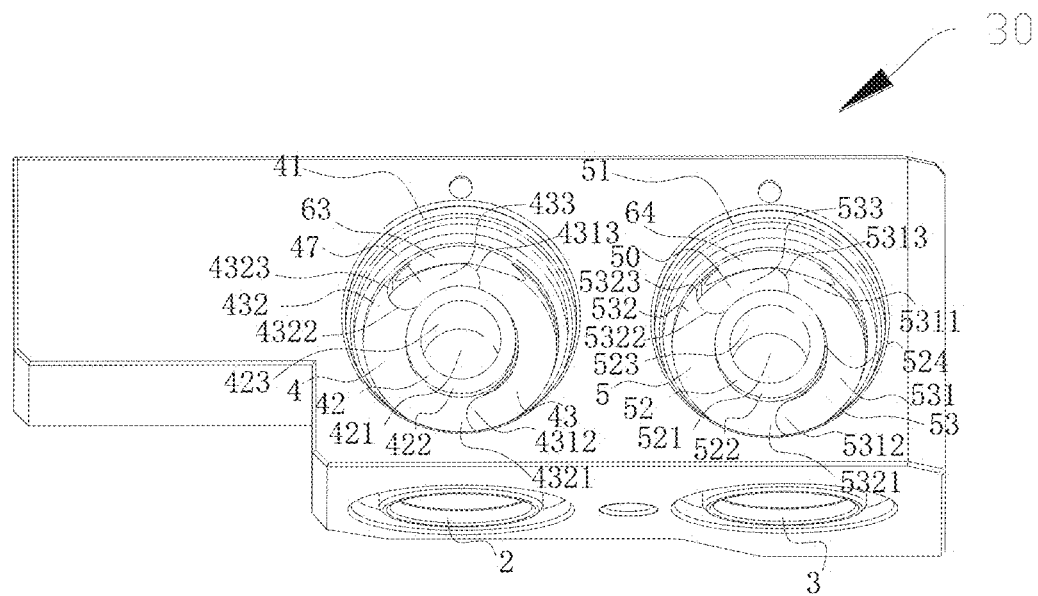
FIG. 8 is a schematic structural view of a third embodiment according to the present application.

In another embodiment, referring to FIG. 8, FIG. 8 illustrates a general structure of a block 30, and most of the structure of the block 30 refers to the above embodiments. The inlet 1 for the fluid is located on the first side portion, and the first outlet and the second outlet are located on the second side portion.

In an embodiment, the first valve port and the second valve port are oppositely arranged and are located at a same position of the first fluid passage in the axial direction. In other embodiments, the first valve port and the second valve port may be located at different positions of the first fluid passage in the axial direction. In an embodiment, the first valve port and the second valve port are located on a same side of the centerline of the first fluid passage.

Figure 9:
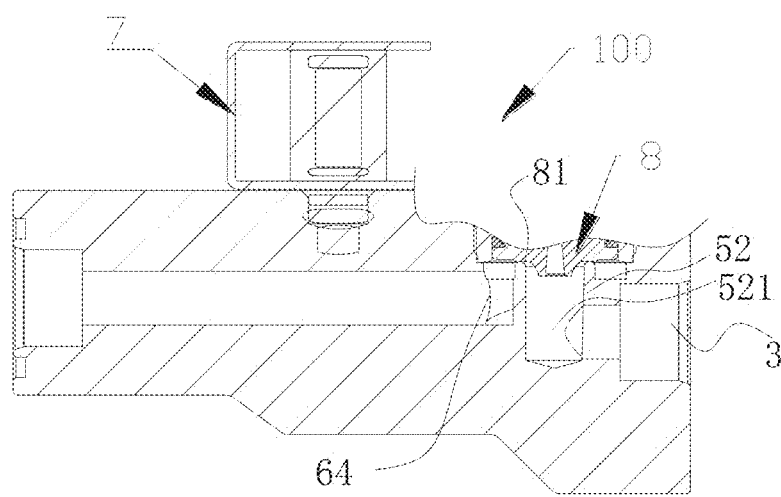
FIG. 9 is a schematic sectional view of an embodiment of a fluid control device according to the present application.

Referring to FIG. 9, FIG. 9 illustrates a fluid control device 100, which includes a first core portion 7, a second core portion 8 and a block, wherein the block includes a first mounting cavity inner wall 41 and a second mounting cavity inner wall 51, at least part of the first core portion 7 is located in a first mounting cavity 4, the first core portion 7 is in sealing arrangement with the first mounting cavity inner wall 41, at least part of the second core portion 8 is located in the second mounting cavity 5, the second core portion 8 is in sealing arrangement with the second mounting cavity inner wall 51, the second core portion 8 includes a second cooperating wall 81, and the first core portion 7 includes a first cooperating wall (a position of the first cooperating wall refers to that of the second cooperating wall).

The fluid control device 100 includes an inlet 1, a first outlet 2, and a second outlet 3. At least part of the first core portion 7 is located in the first mounting cavity 4, and at least part of the second core portion 8 is located in the second mounting cavity 5. After the first core portion 7 and the second core portion 8 are assembled in the first mounting cavity 4 and the second mounting cavity 5 arranged in the block, the first core portion 7 controls the communication or non-communication between the inlet 1 and the first mounting cavity 4, and further controls the communication or non-communication between the inlet 1 and the first outlet 2; and the second core portion 8 controls the communication or non-communication between the inlet 1 and the second mounting cavity 5, and further controls the communication or non-communication between the inlet 1 and the second outlet 3.

The block includes a first top wall 422 and a second top wall 522. The first top wall 422 is located in the first mounting cavity 4, and the second top wall 522 is located in the second mounting cavity 5. At least part of the first cooperating wall cooperates with the first top wall 422. A clearance is reserved between the first cooperating wall and the first top wall 422, and the first mounting cavity 4 is in communication with the first outlet 2; or the first cooperating wall is in sealing arrangement with the first top wall 422, and the first mounting cavity 4 is not in communication with the first outlet 2. At least part of the second cooperating wall 81 cooperates with the second top wall 522. A clearance is reserved between the second cooperating wall 81 and the second top wall 522, and the second mounting cavity 5 is in communication with the second outlet 3; or the second cooperating wall 81 is in sealing arrangement with the second top wall 522, and the second mounting cavity 5 is not in communication with the second outlet 3.

Figure 10:
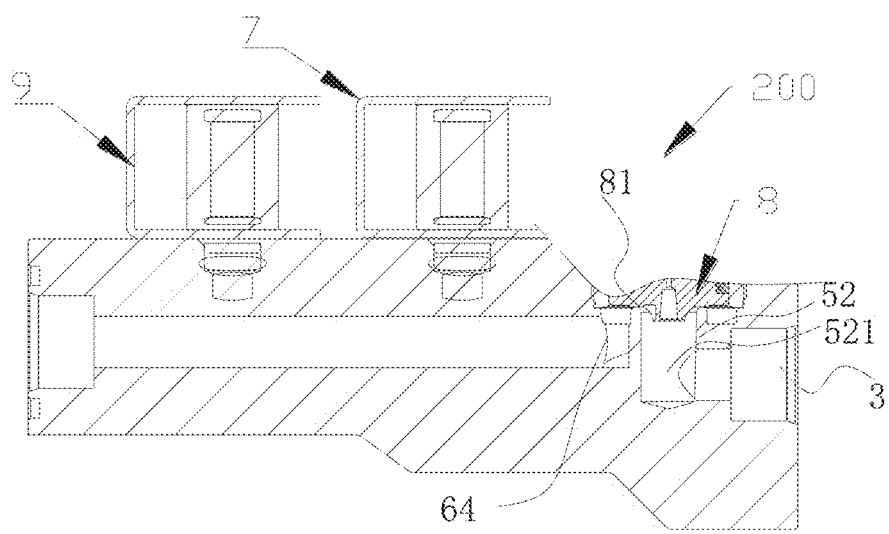
FIG. 10 is a schematic sectional view of another embodiment of the fluid control device according to the present application.

Referring to FIG. 10, FIG. 10 illustrates a schematic structural view of another embodiment of the fluid control device. FIG. 10 illustrates a structure of a fluid control device 200. The fluid control device 200 further includes a third mounting cavity and a third core portion 9. The block includes a third mounting cavity inner wall, at least part of the third core portion 9 is located in the third mounting cavity, and the third core portion 9 is in sealing arrangement with the third mounting cavity inner wall.

The fluid control device 200 includes a first core portion 7, a second core portion 8 and the third core portion 9. In the extending direction of the fluid passage 6, the third core portion 9 is relatively close to the inlet 1. At least part of the first core portion 7 is located in the first mounting cavity, at least part of the second core portion 8 is located in the second mounting cavity, and at least part of the third core portion 9 is located in the third mounting cavity (not shown), where the structures of the first mounting cavity, the second mounting cavity and the third mounting cavity are as described above. In the present embodiment, the structures of the first mounting cavity and the third mounting cavity are similar to those of the first mounting cavity and the second mounting cavity shown in FIG. 8.

The block may be provided with a third outlet at a position of the third core portion 9, such that the fluid control device can achieve a one-in-three-out function. Due to a lower pressure drop, the performance of the whole fluid control device is excellent, and the structure is compact.

The fluid control device 200 includes a third outlet 6", and the inlet 1 is in communication with a third mounting cavity 92. The block includes a third top wall. The third top wall is located in the third mounting cavity 92. At least part of a third cooperating wall 91 is in cooperation with the third top wall. A clearance is reserved between the third cooperating wall 91 and the third top wall, and the third mounting cavity 92 is in communication with the third outlet 6"; or the third cooperating wall 91 is in sealing arrangement with the third top wall, and the third mounting cavity 92 is not in communication with the third outlet 6". The structure of the third mounting cavity refers to the second mounting cavity in the above embodiments. In this way, the fluid control device is integrated with functions of three cores, the fluid entering from the inlet for the fluid can leave out from the first outlet or the second outlet or the third outlet, and the fluid control device can be used for controlling fluid continuity of external pipelines connected with the first outlet, the second outlet, and the third outlet.

Figure 11:
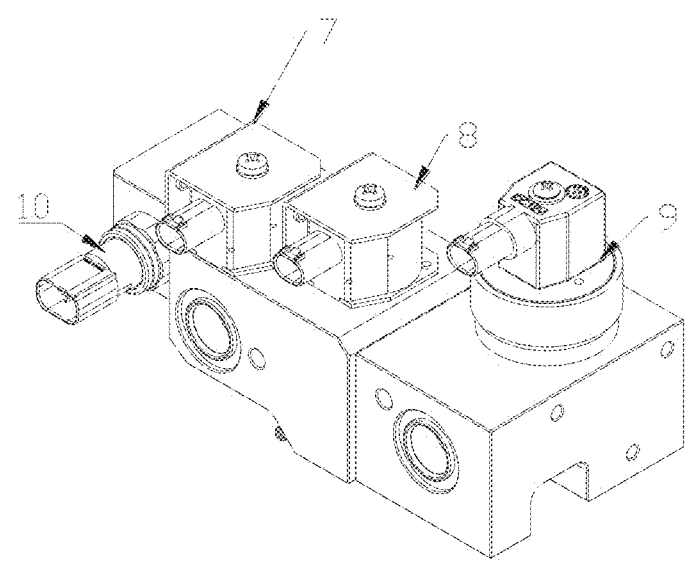
FIG. 11 is a schematic sectional view of yet another embodiment of the fluid control device according to the present application.
Figure 12:
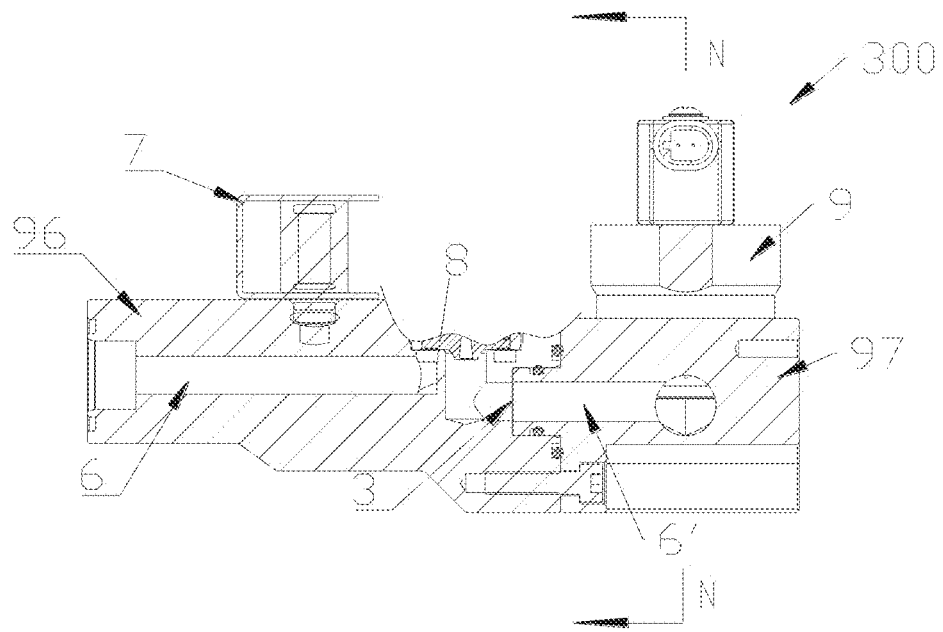
FIG. 12 is a schematic sectional view of the embodiment shown in FIG. 11.
Figure 13:
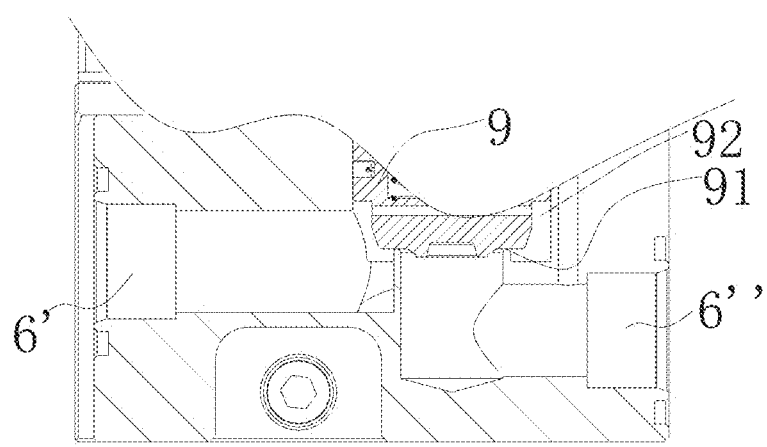
FIG. 13 is a schematic sectional view taken along line N-N in FIG. 12.
Figure 14:
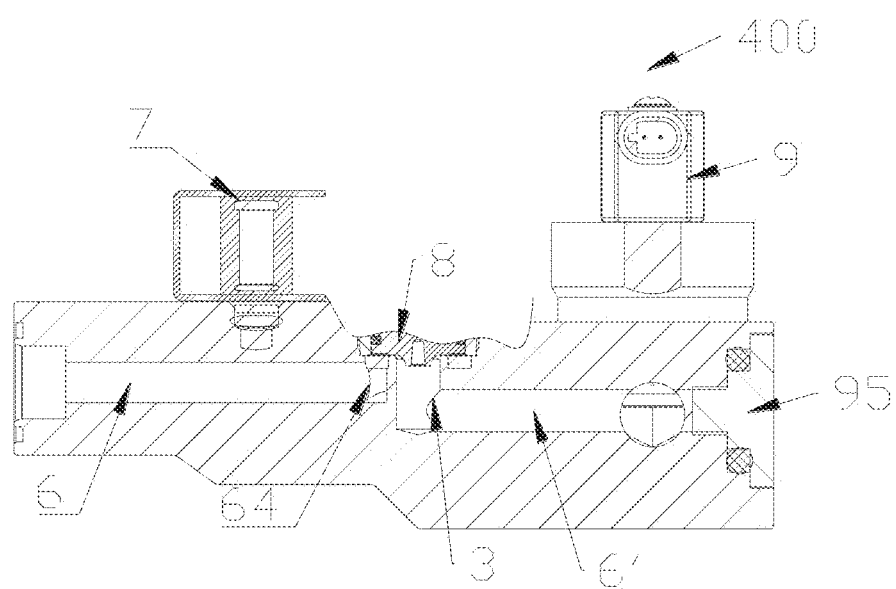
FIG. 14 is a schematic sectional view of yet still another embodiment of the fluid control device according to the present application.

In another embodiment, referring to FIG. 11, FIG. 12 and FIG. 13, FIG. 12 illustrates a structure of a fluid control device 300. In another embodiment, referring to FIG. 14, FIG. 14 illustrates a structure of a fluid control device 400. The fluid control device 300/400 includes the third mounting cavity and the third core portion 9, the block includes the third mounting cavity inner wall, at least part of the third core portion 9 is located in the third mounting cavity, the third core portion 9 is in sealing arrangement with the third mounting cavity inner wall, the third core portion 9 is in sealing arrangement with the third mounting cavity inner wall, and the third core portion 9 includes the third cooperating wall.

The fluid control device 300/400 includes the third outlet 6". The second outlet 3 is in communication with the third mounting cavity. The block includes the third top wall, the third top wall is located in the third mounting cavity, and at least part of the third cooperating wall is in cooperation with the third top wall. A clearance is reserved between the third cooperating wall and the third top wall, and the third mounting cavity is in communication with the third outlet 6"; or the third cooperating wall is in sealing arrangement with the third top wall, and the third mounting cavity is not in communication with the third outlet 6". The block may be of an integral structure or a split structure, the block includes a second fluid passage 6', and the second fluid passage 6' communicates the second outlet 3 with the third mounting cavity.

The third mounting cavity is in communication with the third outlet 6", which refers to that when the third core portion is not assembled in the third mounting cavity, when the third core portion is assembled, the third core portion controls the communication or non-communication between the third mounting cavity and the third outlet. The second fluid passage 6' communicates the second outlet 3 with the third mounting cavity, which can also be understood as the above.

Referring to FIG. 14, the block includes a plug 95, and the plug 95 seals one end of the second fluid passage 6'. Through the arrangement of the plug, the second fluid passage 6' may be processed into a passage with an opening at one end, and by providing the plug, the second fluid passage is sealed, which facilitates the processing. In another embodiment, referring to FIG. 12, the block includes a first portion 96 and a second portion 97, the first portion 96 is in sealing arrangement with the second portion 97, the first portion 96 is provided with a first mounting cavity and a second mounting cavity, the second portion 97 is provided with a third mounting cavity, the second fluid passage 6' is arranged in the second portion 97, one end of the second fluid passage 6' is an open end, and the second outlet 3 is in communication with the open end. The block is divided into two portions for processing, which facilitates processing of the second fluid passage. The two portions are fixed by assembling such as bolt fixing, which are not only easy to process, but also easy to assemble.

Referring to FIG. 11, the fluid control device may further include a sensor 10, and the block may include a mounting hole. At least part of the sensor is located in the mounting hole, and the mounting hole is in communication with the first fluid passage. The sensor may be used for detecting a temperature and/or a pressure inside the first fluid passage, such that the fluid control device can control the first core portion, the second core portion and the third core portion according to signals acquired by the sensor, and can further control the opening or closing of each outlet of the fluid control device.

The invention claimed is:

1. A fluid control device, comprising a first core portion, a block, an inlet and a first outlet, and the block comprising a first mounting cavity and a first fluid passage, wherein an end of the first fluid passage is the inlet, the first fluid passage is in communication with the first mounting cavity, and the inlet is in communication with the first mounting cavity;
the block comprises a passage wall portion forming the first fluid passage, and a periphery side portion of the passage wall portion is at least provided with a first valve port, and the first fluid passage is in communication with the first mounting cavity by the first valve port;
the block at least comprises a first-mounting-cavity bottom wall, and the first-mounting-cavity bottom wall at least comprises a first sub-bottom wall; one end of the first sub-bottom wall is relatively closer to the first valve port than another end of the first sub-bottom wall, and is defined as a first end of the first sub-bottom wall, and the another end of the first sub-bottom wall is relatively farther away from the first valve port than the first end of the first sub-bottom wall, and is defined as a second end of the first sub-bottom wall; and with an axial direction of the first mounting cavity being taken as a height direction, the first sub-bottom wall is extended from the first end of the first sub-bottom wall toward the second end of the first sub-bottom wall in such a manner that the height of the sub-bottom wall is progressively increased;
the first core portion is at least partially located in the first mounting cavity, the first core portion is in sealing arrangement with the first mounting cavity inner wall, and the first core portion comprises a first cooperating wall;
the block comprises the first top wall, the first top wall is located in the first mounting cavity, and at least part of a first cooperating wall is in cooperation with the first top wall; and
a clearance is reserved between the first cooperating wall and the first top wall, and the first mounting cavity is in communication with the first outlet or the first cooperating wall is in sealing arrangement with the first top wall, and the first mounting cavity is not in communication with the first outlet.

2. The fluid control device according to claim 1, wherein the first-mounting-cavity bottom wall at least comprises a first platform portion, the first platform portion is connected to the second end of the first sub-bottom wall, and a height of the first platform portion is higher than the height of the first sub-bottom wall; and
the first mounting cavity comprises a first centerline perpendicular to the first fluid passage and dividing the first mounting cavity into a first mounting sub-cavity and a second mounting sub-cavity, the first mounting sub-cavity is relatively closer to the inlet than the second mounting sub-cavity, the second mounting sub-cavity is relatively farther away from the inlet than the first mounting sub-cavity, most of the first sub-bottom wall is part of a wall portion forming the second mounting sub-cavity, and most of the first platform portion is part of a wall portion forming the first mounting sub-cavity.

3. The fluid control device according to claim 2, wherein the first-mounting-cavity bottom wall at least comprises a second sub-bottom wall, a height of the second sub-bottom wall is lower than the height of the first sub-bottom wall, and the first sub-bottom wall is connected with the first platform portion by the second sub-bottom wall; an end portion, connected with the second end of the first sub-bottom wall, of the first platform portion, is defined as a first end of the first platform portion, and another end of the first platform portion is defined as a second end of the first platform portion
the block comprises a first side wall extending downward from the first end of the first sub-bottom wall and a second side wall extending downward from a second end of the first platform portion, with a direction toward an opening of the first mounting cavity being defined as an upward direction, and a direction toward the first-mounting-cavity bottom wall being defined as a downward direction; and
the first mounting cavity comprises a first groove hole, the first side wall, the second side wall and the second sub-bottom wall are part of a wall portion forming the first groove hole, and the first valve port is arranged on part of a wall portion of a first mounting cavity inner wall forming the first groove hole.

4. The fluid control device according to claim 1, wherein the block comprises a second mounting cavity, the first fluid passage is in communication with the second mounting cavity, another end of the first fluid passage is a second valve port, and the second valve port is configured to communicate the second mounting cavity with the first fluid passage; and
the block at least comprises a second-mounting-cavity bottom wall, and the second-mounting-cavity bottom wall at least comprises a third sub-bottom wall; one end of the third sub-bottom wall is relatively closer to the second valve than another end of the third sub-bottom wall, and is defined as a first end of the third sub-bottom wall, and the another end of the third sub-bottom wall is relatively farther away from the second valve port than the first end of the third sub-bottom wall, and is defined as a second end of the third sub-bottom wall; and with an axial direction of the second mounting cavity being taken as the height direction, the third sub-bottom wall is extended from a first end of the third sub-bottom wall toward a second end of the third sub-bottom wall in such a manner that the height of the sub-bottom wall is progressively increased.

5. The fluid control device according to claim 4, wherein the second-mounting-cavity bottom wall at least comprises a second platform portion, the second platform portion is connected to the second end of the third sub-bottom wall, and with the axial direction of the second mounting cavity being taken as the height direction, a height of the second platform portion is higher than the height of the third sub-bottom wall.

6. The fluid control device according to claim 4, wherein the second-mounting-cavity bottom wall at least comprises a fourth sub-bottom wall, one end of the fourth sub-bottom wall is relatively closer to the second valve port than another end of the fourth sub-bottom wall, and is defined as a first end of the fourth sub-bottom wall, and the another end of the fourth sub-bottom wall is relatively farther away from the second valve port than the first end of the fourth sub-bottom wall, and is defined as a second end of the fourth sub-bottom wall; and with the axial direction of the second mounting cavity being taken as the height direction, the fourth sub-bottom wall is extended extends from the first end of the fourth sub-bottom wall toward the second end of the fourth sub-bottom wall in such a manner that the height of the sub-bottom wall is progressively increased.

7. The fluid control device according to claim 6, wherein the second mounting cavity comprises a second centerline parallel to the first fluid passage and dividing the second mounting cavity into a third mounting sub-cavity and a fourth mounting sub-cavity, the third mounting sub-cavity and the fourth mounting sub-cavity are located on two side of an extending direction of the first fluid passage, most of the third sub-bottom wall is located in the third mounting sub-cavity, and most of the fourth sub-bottom wall is located in the fourth mounting sub-cavity.

8. The fluid control device according to claim 1, wherein the block comprises a second mounting cavity, the first fluid passage is in communication with the second mounting cavity, a periphery side portion of the passage wall portion is provided with a second valve port, and the second valve port is configured to communicate the second mounting cavity with the first fluid passage; and the second-mounting-cavity bottom wall at least comprises a third sub-bottom wall, one end of the third sub-bottom wall is relatively closer to the second valve port than another end of the third sub-bottom wall, and is defined as a first end of the third sub-bottom wall, and the another end of the third sub-bottom wall is relatively farther away from the second valve port than the first end of the third sub-bottom wall, and is defined as a second end of the third sub-bottom wall; and the third sub-bottom wall is extended from the first end of the third sub-bottom wall toward the second end of the third sub-bottom wall in such a manner that the height of the sub-bottom wall is progressively increased.

9. The fluid control device according to claim 8, wherein the second-mounting-cavity bottom wall at least comprises a second platform portion, the second platform portion is connected to the second end of the third sub-bottom wall, and the second-mounting-cavity bottom wall at least comprises a fifth sub-bottom wall; and with the axial direction of the second mounting cavity being taken as the height direction, a height of the fifth sub-bottom wall is lower than the height of the third sub-bottom wall, and the fifth sub-bottom wall is configured to connect the third sub-bottom wall with the second platform portion.

10. The fluid control device according to claim 9, wherein the block comprises a third side wall extending downward from the first end of the third sub-bottom wall and a fourth side wall extending downward from the second end of the second platform portion, with a direction toward an opening of the second mounting cavity being defined as an upward direction, and a direction toward the second-mounting-cavity bottom wall being defined as a downward direction; and the second mounting cavity comprises a second groove hole, the third side wall, the fourth side wall and the fifth sub-bottom wall are part of a wall portion forming the second groove hole, and the second valve port is arranged on part of a wall portion of a second mounting cavity inner wall forming the second groove hole.

11. The fluid control device according to claim 4, wherein the block comprises a first outlet, the first mounting cavity inner wall and a first annular portion, the first mounting cavity inner wall is part of a wall portion forming the first mounting cavity, and the first annular portion is located in a middle of the first mounting cavity; the first-mounting-cavity bottom wall is extended radially from a circumferential outer edge of the first annular portion to the first mounting cavity inner wall; the first annular portion comprise a first through hole, the first through hole is in communication with the first mounting cavity, and the first through hole is in communication with the first outlet; the first annular portion comprises a first top wall, a first annular inner wall and a first annular outer wall, the first annular inner wall is part of a wall portion forming the first through hole, the first top wall and the first annular outer wall are part of the wall portion forming the first mounting cavity, and an inner diameter of the first annular outer wall is smaller than an inner diameter of the first mounting cavity; with the axial direction of the first mounting cavity being taken as the height direction, a height of the first annular outer wall is lower than a height of the first mounting cavity inner wall, and a height of the first-mounting-cavity bottom wall is lower than a height of the first top wall; and the first-mounting-cavity bottom wall at least comprises the first platform portion, and the height of the first platform portion is lower than the height of the first top wall;

the block further comprises a second outlet, the second mounting cavity inner wall and a second annular portion, the second mounting cavity inner wall is part of a wall portion forming the second mounting cavity, and the second annular portion is located in a middle of the second mounting cavity; and the second annular portion comprise a second through hole, the second through hole is in communication with the second mounting cavity, and the second through hole is in communication with the second outlet; the second annular portion comprises a second top wall, a second annular inner wall and a second annular outer wall, the second annular inner wall is part of a wall portion forming the second through hole, the second top wall and the second annular outer wall are part of the wall portion forming the second mounting cavity, and an inner diameter of the second annular outer wall is smaller than an inner diameter of the second mounting cavity inner wall; and with the axial direction of the second mounting cavity being taken as the height direction, a height of the second annular outer wall is lower than a height of the second mounting cavity inner wall, a height of the second-mounting-cavity bottom wall is lower than a height of the second top wall, and the height of the second mounting cavity inner wall is higher than a height of the second top wall.

12. The fluid control device according to claim 8, wherein the fluid control device further comprises a second core portion and a third core portion, the block comprises the second mounting cavity, the second mounting cavity inner wall, a third mounting cavity and a third mounting cavity inner wall, at least part of the second core portion is located in the second mounting cavity, the second core portion is in sealing arrangement with the second mounting cavity inner wall, the second core portion comprises a second cooperating wall, at least part of the third core portion is located in the third mounting cavity, the third core portion is in sealing arrangement with the third mounting cavity inner wall, and the third core portion comprises a third cooperating wall; and the fluid control device comprises a second outlet and a third outlet, the inlet is in communication with the second mounting cavity, the inlet is in communication with the third mounting cavity or the second outlet is in communication with the third mounting cavity, the block comprise the second top wall and a third top wall, the second top wall is located in the second mounting cavity, the third top wall is located in the third mounting cavity, and at least part of the second cooperating wall is in cooperation with the second top wall;

a clearance is reserved between the second cooperating wall and the second top wall, and the second mounting cavity is in communication with the second outlet; or the second cooperating wall is in sealing arrangement with the second top wall, and the second mounting cavity is not in communication with the second outlet; and at least part of the third cooperating wall is in cooperation with the third top wall, a clearance is reserved between the third cooperating wall and the third top wall, and the third mounting cavity is in communication with the third outlet; or the third cooperating wall is in sealing arrangement with the third top wall, and the third mounting cavity is not in communication with the third outlet.

13. The fluid control device according to claim 12, wherein the block comprises a second fluid passage, and the second fluid passage is configured to communicate the second outlet with the third mounting cavity; and the block comprises a plug, the plug seals an end of the second fluid passage; or the block comprises a first portion and a second portion, the first portion is in sealing arrangement with the second portion, the first portion is provided with the first mounting cavity and the second mounting cavity, the second portion is provided with the third mounting cavity, the second fluid passage is arranged in the second portion, one end of the second fluid passage is an open end, and the second outlet is in communication with the open end.

14. The fluid control device according to claim 12, wherein the fluid control device comprises a sensor, the block comprises a mounting hole, at least part of the sensor is located in the mounting hole, and the mounting hole is in communication with the first fluid passage.

15. The fluid control device according to claim 5, wherein the second-mounting-cavity bottom wall at least comprises a fourth sub-bottom wall, one end of the fourth sub-bottom wall is relatively closer to the second valve port than another end of the fourth sub-bottom wall, and is defined as a first end of the fourth sub-bottom wall, and the another end of the fourth sub-bottom wall is relatively farther away from the second valve port than the first end of the fourth sub-bottom wall, and is defined as a second end of the fourth sub-bottom wall; and with the axial direction of the second mounting cavity being taken as the height direction, the fourth sub-bottom wall is extended extends from the first end of the fourth sub-bottom wall toward the second end of the fourth sub-bottom wall in such a manner that the height of the sub-bottom wall is progressively increased.

16. The fluid control device according to claim 13, wherein the fluid control device comprises a sensor, the block comprises a mounting hole, at least part of the sensor is located in the mounting hole, and the mounting hole is in communication with the first fluid passage.

17. A block, comprising a first mounting cavity and a first fluid passage, wherein an end of the first fluid passage is an inlet, the first fluid passage is in communication with the first mounting cavity, and the inlet is in communication with the first mounting cavity;

the block comprises a passage wall portion forming the first fluid passage, and a periphery side portion of the passage wall portion is at least provided with a first valve port, and the first fluid passage is in communication with the first mounting cavity by the first valve port; and the block at least comprises a first-mounting-cavity bottom wall, and the first-mounting-cavity bottom wall at least comprises a first sub-bottom wall; one end of the first sub-bottom wall is relatively closer to the first valve port than another end of the first sub-bottom wall, and is defined as a first end of the first sub-bottom wall, and the another end of the first sub-bottom wall is relatively farther away from the first valve port than the first end of the first sub-bottom wall, and is defined as a second end of the first sub-bottom wall; and with an axial direction of the first mounting cavity being taken as a height direction, the first sub-bottom wall is extended from the first end of the first sub-bottom wall toward the second end of the first sub-bottom wall in such a manner that the height of the sub-bottom wall is progressively increased.

* * * * *